United States Patent
Fedullo

(12) 
(10) Patent No.: US 9,308,793 B2
(45) Date of Patent: Apr. 12, 2016

(54) MULTI-DENSITY JOUNCE BUMPER

(75) Inventor: Joseph S. Fedullo, Harrison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 132 days.

(21) Appl. No.: 13/560,019

(22) Filed: Jul. 27, 2012

(65) Prior Publication Data

US 2013/0285301 A1    Oct. 31, 2013

Related U.S. Application Data

(60) Provisional application No. 61/638,124, filed on Apr. 25, 2012.

(51) Int. Cl.
| | | |
|---|---|---|
| *B60G 11/22* | (2006.01) | |
| *F16F 1/37* | (2006.01) | |
| *F16F 1/373* | (2006.01) | |
| *F16F 1/44* | (2006.01) | |

(52) U.S. Cl.
CPC . *B60G 11/22* (2013.01); *F16F 1/37* (2013.01); *F16F 1/373* (2013.01); *F16F 1/44* (2013.01); *B60G 2202/143* (2013.01); *B60G 2204/45* (2013.01); *B60G 2204/4502* (2013.01)

(58) Field of Classification Search
CPC ............. F16F 1/38; F16F 1/371; F16F 1/387; F16F 1/3732; F16F 1/3842; F16F 9/067; F16F 2236/12; B60G 11/22; B60G 7/04; B60G 2202/143; B60G 2204/41; B60R 19/26; B60R 19/30; B60R 19/32; B60R 19/34
USPC ........................... 267/139, 152, 153, 292, 293
See application file for complete search history.

(56) References Cited

U.S. PATENT DOCUMENTS

| | | | | |
|---|---|---|---|---|
| 4,085,832 | A | | 4/1978 | Gaines et al. |
| 5,308,104 | A | * | 5/1994 | Charles ................... B60G 11/52 267/220 |
| 2002/0063369 | A1 | * | 5/2002 | Huang .................. F16F 1/3732 267/153 |
| 2008/0012178 | A1 | * | 1/2008 | Dickson ................ B29C 43/021 264/321 |
| 2008/0012188 | A1 | * | 1/2008 | Dickson ................ F16F 1/3732 267/139 |
| 2011/0133380 | A1 | * | 6/2011 | Harden .................. B60G 11/52 267/292 |

FOREIGN PATENT DOCUMENTS

| | | |
|---|---|---|
| DE | 202005012528 U1 | 10/2005 |
| DE | 102005030528 A1 † | 1/2007 |
| JP | 2006010083 A | 1/2006 |

\* cited by examiner
† cited by third party

*Primary Examiner* — Anna Momper
*Assistant Examiner* — San Aung
(74) *Attorney, Agent, or Firm* — Quinn Law Group, PLLC

(57) ABSTRACT

A one-piece, multi-density, jounce bumper is provided. The multi-density jounce bumper incorporates the necessary soft or low entry rate or stiffness, which is necessary to provide adequate feel and ride control, as well as the necessary energy capacity to manage peak loads, during a high-intensity impact event, such as an encounter with a pothole or the like. The multi-density jounce bumper may be configured as a single unitary component having a body, which may include a tip end and a base end. The body may be composed of a resilient material, the resilient material having a density that transitions from a first density at the tip end to a second density at the base end. The body may increase or decrease in density, in g/cc, from tip end to base end, along the body.

20 Claims, 3 Drawing Sheets

MULTI-DENSITY JOUNCE BUMPER

CROSS REFERENCE TO RELATED APPLICATIONS

This application claims the benefit of U.S. Provisional Application No. 61/638,124, filed Apr. 25, 2012, which is hereby incorporated by reference in its entirety.

TECHNICAL FIELD

The disclosure relates to a multi-density jounce bumper for use in a motor vehicle suspension system.

BACKGROUND

Motor vehicle suspension systems may be configured to allow the vehicle wheel assembly to follow elevation changes in the road surface, by supporting the weight of the vehicle and allowing for relative vertical movement between a vehicle wheel and a vehicle during travel, essentially isolating wheel disturbances from the vehicle body. As the wheel assembly of a motor vehicle encounters road inputs, during travel, the suspension system undergoes compression strokes (jounce) and extension strokes (rebound).

Jounce bumpers are utilized to provide force and to absorb and store energy during jounce. During a high intensity impact event, such as encountering a series of potholes, a bump, or a foreign object in the roadway, the jounce bumper may be configured to contact a stop within the motor vehicle suspension and may elastically deform to provide the force of contact against the vehicle body. As elastic deformation of the jounce bumper increases, in compression, the force provided by the jounce bumper also increases to a limit, at which the bumper stops the relative movement of the wheel assembly toward the vehicle body.

It is desirable that jounce bumpers provide the lowest entry rate or stiffness possible to improve vehicle ride quality, while still maintaining a rate or stiffness with sufficient energy capabilities to combat and/or manage peak loads during a high intensity impact event.

SUMMARY

A one-piece, multi-density, jounce bumper is provided. The multi-density jounce bumper incorporates the necessary soft or low entry rate or stiffness, which is necessary to provide adequate feel and ride control, as well as the necessary energy capacity to manage peak loads, during a high-intensity impact event, such as an encounter with a pothole or the like.

The multi-density jounce bumper may be configured as a single unitary component having a body, which may include a tip end and a base end. The body may define a central bore along a longitudinal axis.

The body of the multi-density jounce bumper may include a plurality of discrete density sections along the longitudinal axis, including at least an initial tip section, proximate the tip end, and a final base section proximate the base end. Each of the plurality of sections having a discrete density, which is a uniform density throughout the respective section. The bumper body may increase or decrease in density (g/cc), along the body, from the initial tip end section to final base end section. This change in density along the body of the bumper allows the bumper to maintain the sufficient energy capacity to manage peak loads, as well as a relatively low entry rate to provide a smooth vehicular ride.

The body of the multi-density jounce bumper may alternatively be configured as a single unitary piece with a density that transitions linearly along the longitudinal axis, gradually increasing or decreasing in density (g/cc) from tip end to base end, absent a plurality sections of discrete uniform density.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Those having ordinary skill in the art will recognize that terms such as "above," "below," "downward," "upward," "top," "bottom," etc., are used descriptively for the figures, and do not represent limitations on the scope of the invention.

Referring to the Figures, wherein like reference numbers correspond to like or similar components throughout the several views, a multi-density jounce bumper 100 is provided. The jounce bumper 100 is operable in a motor vehicle suspension system. Jounce bumpers generally may be configured in a variety of shapes adjusted for the particular needs, compression requirements, and design of the bumper assembly.

Figure 1:
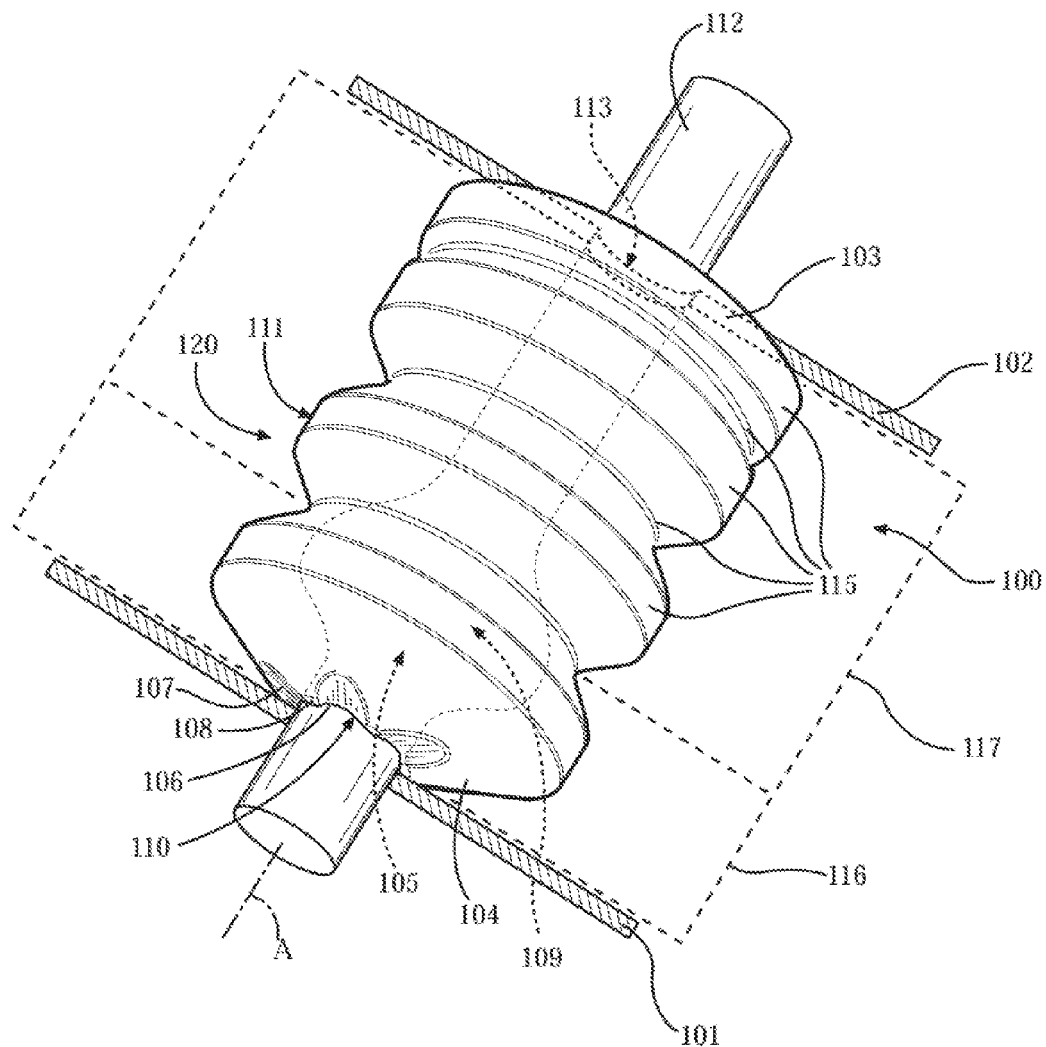
FIG. 1 is a perspective view of an example multi-density jounce bumper.

Referring to FIG. 1, the multi-density jounce bumper 100 may be configured as a single unitary component, and may be of any resilient material such as variety of elastomers or microcellular urethane materials, including but not limited to NDI, MDI, TODI, and the like.

The multi-density jounce bumper 100 may further include a body 120 which may include a base end 103 and a tip end 104. The jounce bumper 100 may be configured for placement between a first tip end suspension component 101 and a second base end suspension component 102.

The multi-density jounce bumper body 120 may define a central bore 105 along a longitudinal axis A, from the base end 103 to the tip end 104. The central bore 105 may further define an inner radial surface 110. The central bore 105 may be configured to receive a member 112 such as a piston rod, mounting bolt, or other fastener, known in the art, which may be configured to mount the jounce bumper 100 to the vehicle frame (not shown). The member 112 may be fitted within the central bore 105 and remain in continuous contact with the inner radial surface 110. The jounce bumper 100 may also include an outer surface 111.

The tip end 104 may be polygonal or annular in shape. The tip end 104 may define a tip void 106, which may be central to the tip end 104. The tip end 104 may also define a plurality of cut sections 107 and a plurality of raised sections 108 formed about the tip void 106. The plurality of cut sections 107 and the plurality of raised sections 108 may be configured to reduce the spring rate of the jounce bumper 100 during initial contact between the tip end 104 and the first tip end suspension component 101.

An under-cut section 109 may be formed beneath the tip end 104 between the tip void 106 and the central bore 105. The under-cut section 109 may be formed by removing a part of the material from the bumper body 120 between the inner surface 110 and the outer surface 111. The under-cut section 109 may be configured to reduce the spring rate of the bumper 100 during initial contact between the tip end 104 and the first tip end suspension component 101.

The base end 103 may define a base void 113 at the juncture between the base end 101 and the central bore 105. The base void 113 may be central to the base end 103.

The jounce bumper body 120 may further include a plurality of convolutes 115 formed upon the outer surface 111 along the longitudinal axis A, between the base end 103 and the tip end 104.

As shown in FIG. 1, the multi-density jounce bumper body 120 may include a plurality of sections 116, 117, etc., each of the respective sections being composed of a resilient material and having a discrete uniform density throughout, the density of the body gradually increasing or decreasing in g/cc, incrementally by section, from tip end 104 to the base end 103.

The multi-density jounce bumper body 120 may include at least two sections, an initial tip section 116 and a final base section 117. The initial tip section 116 may be composed of a lower density material having a relatively low entry rate to provide for a smooth vehicular ride; alternatively, the initial tip section 116 may be composed of a higher density material having a relatively high entry rate to provide the sufficient energy capacity to manage peak loads. The final base section 117 may be composed of a relatively dense material, having sufficient energy capacity to manage peak loads; alternatively, the final base section 117 may be composed of a lower density material having a relatively low entry rate to provide for a smooth vehicular ride. The density of the jounce bumper body 120 may increase by up to 300% between the initial tip section 116 and the final base section 117.

In a configuration in which the density of the jounce bumper body 120 gradually increases in g/cc, from tip end 104 to base end 103, the density of the material composing the final base section 117 shall exceed the density of the material composing the initial tip section 116 and the additional plurality of preceding sections proximate the tip end 104.

In a configuration in which the density of the jounce bumper body 120 gradually decreases in g/cc, from tip end 104 to base end 103, the density of the material composing the initial tip section 116 shall exceed the density of the material composing the final base section 117 and the additional plurality of preceding sections proximate the base end 104.

While only two discrete sections 116, 117 are shown in FIG. 1, it is to be understood that the multi-density jounce bumper body 120 may contain any number of sections having a discrete uniform density throughout, between the initial tip section 116 and the final base section 117, which increase or decrease in density (g/cc) from tip end 104 to base end 103.

Alternatively, the multi-density jounce bumper body 120 may be configured as a unitary piece, absent a plurality of cross-sections 116, 117, etc. of discrete density. The multi-density jounce bumper body 120, of this example configuration may be configured to have a density that transitions continuously along the body 120 and the longitudinal axis A, gradually increasing or decreasing in g/cc from the tip end 104 to the base end 103. The transition in density along the body 120 from tip end 104 to base end 103 may be a linear transition.

In a configuration in which the density of the jounce bumper body 120 gradually increases from tip end 104 to base end 103, the density of the jounce bumper body 120 may increase by up to 300%, in g/cc, continuously from the tip end 104 to the base end 103.

Alternatively, in a configuration in which the density of the jounce bumper body 120 gradually decreases from tip end 104 to base end 103, the density of the jounce bumper body 120 may increase by up to 300%, in g/cc, from the base end 103 to the tip end 104.

Figure 2:
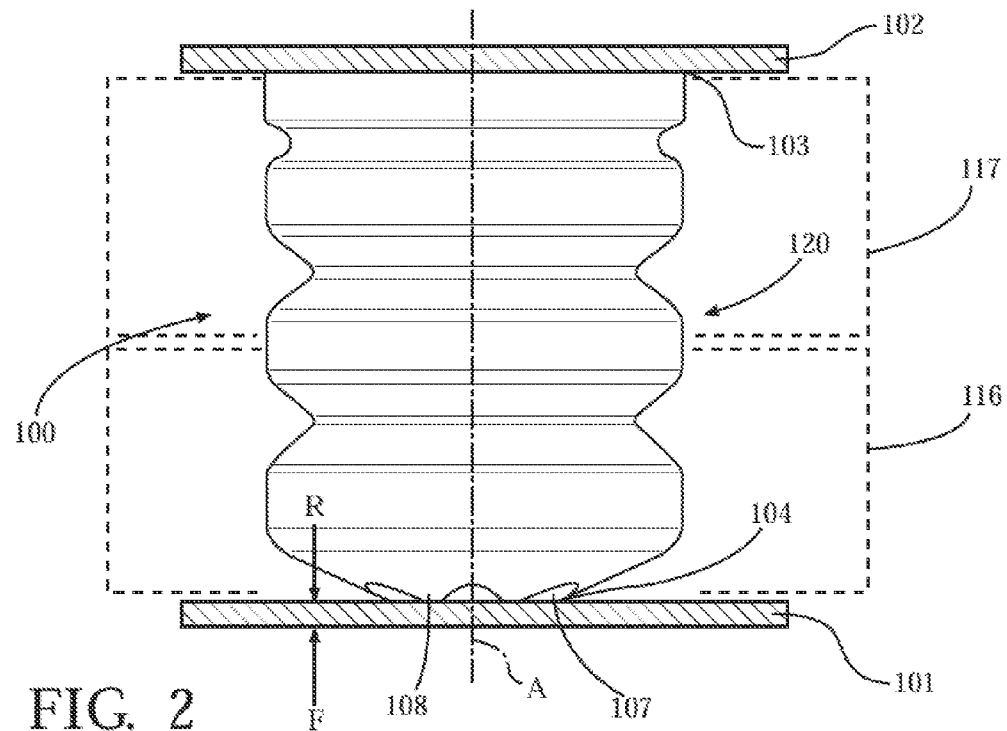
FIG. 2 is an elevation view of an example multi-density jounce bumper when the vehicle is at rest.
Figure 3:
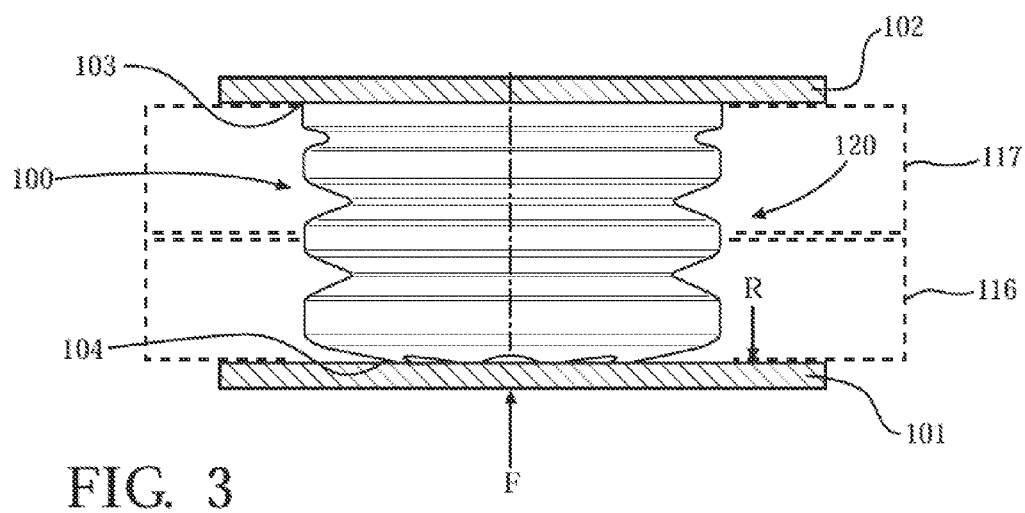
FIG. 3 is an elevation view of an example multi-density jounce bumper in compression, during a high intensity impact event.

Referring generally to FIGS. 2 and 3, in operation, the jounce bumper 100 may contact a stop or second base suspension component 102 within the motor vehicle suspension. The jounce bumper 100 may elastically deform to absorb an impact or jounce force F, which may be applied by the first tip end suspension component 101 upon the multi-density jounce bumper 100.

As shown in FIG. 3, the multi-density jounce bumper 100 may be axially compressed along the longitudinal axis A, between the first tip end suspension component 101 and the second base end suspension component 102. As maximum jounce is approached, jounce force F and energy are exchanged between the first tip end suspension component 101 and the multi-density jounce bumper 100. In an example configuration, wherein the density of the bumper 100 increases in g/cc, from tip end 104 to base end 103, the initial tip section 116 provides a first stage of response to the jounce force F, by providing a low-entry rate, resilient, reaction force R against the jounce force F. The initial tip section 116 may also absorb jounce energy until it is fully compressed or saturated. This reaction would be similar for each of the respective subsequent sections of increasing density within the plurality of cross-sections of predetermined, discrete densities.

As the jounce force F and jounce energy move through each of the subsequent sections 116, 117, etc. from tip end 104 to base end 103 the reaction force R is increased and the feel of the vehicular ride stiffens in an increasing manner to minimize ride disruption and enhance load control. The final base section 117 provides a final stage of response to jounce by providing a high-entry rate resilient reaction force R against the jounce force F until compressed or saturated during a high intensity impact event.

Figure 4:
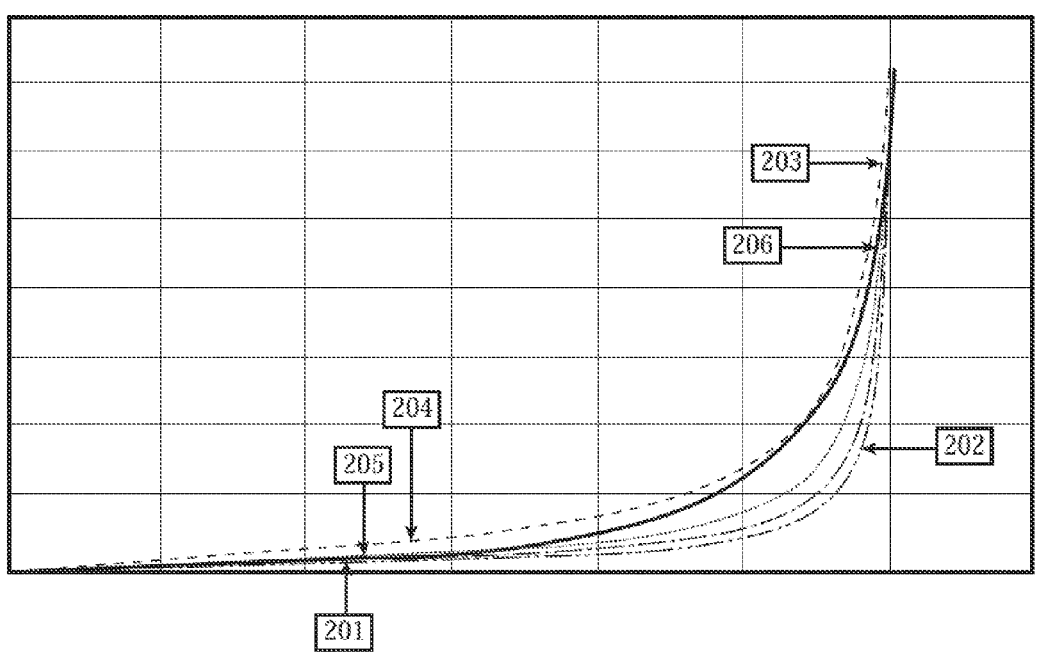
FIG. 4 is a graph of force v. displacement of multiple baseline single-density jounce bumpers compared with the force v. displacement graphic of an example multi-density jounce bumper.

As shown by the graph in FIG. 4, singular low-density jounce bumpers, shown in dotted line format, may have the capacity to provide a soft initial entry rate, shown at block 201. The low-density bumpers 100 shown at block 201, sacrifice energy capacity to withstand a high intensity suspension event, shown at block 202. Alternatively, singular high-density jounce bumpers 100, may possess sufficient energy capacity to withstand a high intensity impact event, shown at block 203. These high-density jounce bumpers 100 sacrifice the soft initial entry rate, at block 204, depleting the ride quality of the vehicle.

The multi-density jounce bumper 100 allows for sufficient energy capacity to withstand a high intensity impact event, as well as maintaining ride quality. By way of example, a bumper 100 in which the density increases in g/cc, from tip end 104 to base end 103. Such an example jounce bumper 100 provides a softer initial entry rate provided by the lower density material proximate the tip end 104, which may provide improved ride quality for vehicle occupants, shown at block 205. Additionally, the multi-density jounce bumper 100 also maintains increased energy capacity, shown at block 206, for high intensity suspension events such as pot holes or the like, due to the high density material proximate the base end 103.

The multi-density jounce bumper allows for the adjustment of the force v. compression curve by simply manipulating the density within a single component rather than utilizing an additional component, such as a circumferential ring, jounce bumper 100 cup, or a load mount striker cap of either higher or lower density than the jounce bumper 100 itself, all of which are known in the prior art. The multi-density jounce bumper may additionally be configured to be utilized with a circumferential ring, a jounce bumper cup, or a load mount striker cap, to further modify the force v. compression curve. However, the multi-density formation allows the manipulation to be done without the necessity of an additional component.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A jounce bumper for use in a motor vehicle suspension system comprising:
    a body having a tip end and a base end;
    wherein the body is composed of a resilient material, the resilient material having a density that continuously transitions along the body from a first density at the tip end to a second density at the base end, such that the density of the resilient material transitions according to a continuous function; and
    wherein the continuous function is a linear function, such that the density of the resilient material transitions linearly along the body from the first density at the tip end to the second density at the base end.

2. The jounce bumper of claim 1 wherein the first density at the tip end is up to three times greater than the second density at the base end.

3. The jounce bumper of claim 1 wherein the second density at the base end is up to three times greater than the first density at the tip end.

4. The jounce bumper of claim 1 wherein the jounce bumper is formed as a single unitary piece.

5. The jounce bumper of claim 1 wherein the resilient material further comprises a microcellular urethane material.

6. The jounce bumper of claim 5 wherein the microcellular urethane material is methylene diphenyl diisocyanate (MDI).

7. The jounce bumper of claim 5 wherein the microcellular urethane material is naphthalene diisocyanate (NDI).

8. The jounce bumper of claim 5 wherein the microcellular urethane material is o-tolidine diisocyanate (TODI).

9. The jounce bumper of claim 1 further comprising:
    a central bore defined by the jounce bumper body;
    an inner radial surface defined by the central bore;
    a member disposed within the central bore and in continuous contact with the inner radial surface; and
    wherein the member is configured to mount the jounce bumper to a vehicle frame.

10. A vehicle comprising:
    a vehicle suspension system including:
        a first tip end suspension component;
        a second base end suspension component; and
        a member axially disposed between the first tip end suspension component and the second base end suspension component;
    a jounce bumper configured to be axially disposed between the first tip end suspension component and the second base end suspension component, the jounce bumper including:
        a body having a tip end, a base end, a central bore, and an inner radial surface defined by the central bore, the member disposed within the central bore and in continuous contact with the inner radial surface; and
        wherein the jounce bumper body is composed of a resilient material having a density that transitions according to a continuous linear function between a first density at the tip end and a second density at the base end, such that the density of the resilient material continuously and linearly transitions along the body by up to 300% between the tip end and base end.

11. The vehicle of claim 10 wherein the resilient material further comprises a microcellular urethane material.

12. The jounce bumper of claim 3 wherein the density of the resilient material increases linearly along the body from the first density at the tip end to the second density at the base end.

13. The vehicle of claim 10 wherein the first density is up to three times greater than the second density, such that the density of the resilient material decreases linearly along the body from the first density at the tip end to the second density at the base end.

14. The vehicle of claim 10 wherein the second density is up to three times greater than the first density, such that the density of the resilient material increases linearly along the body from the first density at the tip end to the second density at the base end.

15. A vehicle comprising:
    a vehicle suspension system including:
        a first tip end suspension component;
        a second base end suspension component; and
        a member axially disposed between the first tip end suspension component and the second base end suspension component;
    a jounce bumper configured to be axially disposed between the first tip end suspension component and the second base end suspension component, the jounce bumper including:
        a jounce bumper body having a tip end defining a tip void, a base end defining a base void, a central bore, and an inner radial surface defined by the central bore, wherein the member is disposed within the central bore and in continuous contact with the inner radial surface;
    wherein the tip end defines a plurality of cut sections and a plurality of raised sections formed about the tip void, such that the plurality of cut sections and the plurality of raised sections are adjacent to the first tip end suspension component; and
    wherein the jounce bumper body is composed of a resilient material having a density that transitions according to a continuous linear function between a first density at the tip end and a second density at the base end, such that the density of the resilient material continuously and linearly transitions along the body by up to 300% between the tip end and base end.

16. The vehicle of claim 15 wherein the first density is up to three times greater than the second density, such that the density of the resilient material decreases linearly along the body from the first density at the tip end to the second density at the base end.

17. The vehicle of claim 15 wherein the second density is up to three times greater than the first density, such that the density of the resilient material increases linearly along the body from the first density at the tip end to the second density at the base end.

18. The vehicle of claim 15 wherein the resilient material further comprises a microcellular urethane material.

19. The vehicle of claim 18 wherein the microcellular urethane material is one of methylene diphenyl diisocyanate (MDI), naphthalene diisocyanate (NDI), and o-tolidine diisocyanate (TODI).

20. The jounce bumper of claim 2 wherein the density of the resilient material decreases linearly along the body from the first density at the tip end to the second density at the base end.

\* \* \* \* \*